(12) United States Patent
Arnold et al.

(10) Patent No.: US 8,794,589 B2
(45) Date of Patent: Aug. 5, 2014

(54) ACTUATOR HAVING AN OVERRIDE APPARATUS

(75) Inventors: David Anthony Arnold, Marshalltown, IA (US); David George Halm, Haverhill, IA (US); Michael Wildie McCarty, Marshalltown, IA (US)

(73) Assignee: Fisher Controls International, LLC, Marshalltown, IA (US)

( * ) Notice: Subject to any disclaimer, the term of this patent is extended or adjusted under 35 U.S.C. 154(b) by 806 days.

(21) Appl. No.: 12/360,678

(22) Filed: Jan. 27, 2009

(65) Prior Publication Data

US 2010/0187454 A1    Jul. 29, 2010

(51) Int. Cl.
| | |
|---|---|
| *F16K 31/44* | (2006.01) |
| *F16K 31/00* | (2006.01) |
| *F16K 35/00* | (2006.01) |
| *F01B 7/00* | (2006.01) |
| *F01B 7/10* | (2006.01) |

(52) U.S. Cl.
USPC .................. 251/73; 251/14; 251/67; 251/94; 92/62; 92/63; 92/65

(58) Field of Classification Search
USPC ............. 251/66, 14, 25, 27, 28, 60, 62, 63.5, 251/63.6, 64, 89, 67, 73; 92/62, 63, 65
See application file for complete search history.

(56) References Cited

U.S. PATENT DOCUMENTS

| | | | |
|---|---|---|---|
| 607,265 A * | 7/1898 | McLean ........................ 251/31 |
| 3,029,060 A * | 4/1962 | Anderson ...................... 251/14 |
| 3,482,777 A * | 12/1969 | Quinn ............................ 236/87 |
| 3,895,651 A | 7/1975 | Okada et al. | |
| 4,007,906 A * | 2/1977 | Karpenko ...................... 251/26 |
| 4,295,630 A | 10/1981 | Card et al. | |
| 4,568,058 A * | 2/1986 | Shelton .......................... 251/62 |
| 4,705,065 A * | 11/1987 | McNeely et al. ......... 137/484.6 |
| 4,726,395 A * | 2/1988 | Howes et al. ................. 137/469 |
| 4,934,652 A | 6/1990 | Golden | |
| 5,067,323 A * | 11/1991 | Bennett et al. ................. 60/734 |
| 5,348,036 A * | 9/1994 | Oksanen et al. ................. 137/1 |
| 6,076,490 A | 6/2000 | Esch et al. | |
| 6,397,892 B1 * | 6/2002 | Pyle et al. .................. 137/637.2 |

(Continued)

FOREIGN PATENT DOCUMENTS

| | | |
|---|---|---|
| DE | 1187026 | 2/1965 |
| DE | 19933165 | 1/2001 |

(Continued)

OTHER PUBLICATIONS

Emerson Process Management, "377 Series Trip Valves," Product Bulletin for 377 Series Trip Valves, published May 2006, 8 pages.

(Continued)

*Primary Examiner* — John K Fristoe, Jr.
*Assistant Examiner* — Hailey K Do
(74) *Attorney, Agent, or Firm* — Hanley, Flight and Zimmerman, LLC

(57) ABSTRACT

Actuators having override apparatus are described herein. An example actuator having an override apparatus includes a first actuator stem coupled to a control actuation member. The override apparatus is operatively coupled to the actuator. A spring is coupled to an override member to move the first actuator stem to a predetermined position in response to an override condition.

33 Claims, 12 Drawing Sheets

(56) References Cited

U.S. PATENT DOCUMENTS

| | | | | |
|---|---|---|---|---|
| 6,592,095 | B2* | 7/2003 | Kabasin et al. | 251/64 |
| 6,684,897 | B2* | 2/2004 | Sundararajan | 137/15.19 |
| 6,708,489 | B2* | 3/2004 | Massey et al. | 60/406 |
| 6,807,895 | B2* | 10/2004 | Hirano et al. | 92/13.6 |
| 7,744,060 | B2* | 6/2010 | Sneh | 251/46 |
| 8,549,984 | B2 | 10/2013 | Arnold | |
| 2007/0187634 | A1 | 8/2007 | Sneh | |
| 2008/0251146 | A1* | 10/2008 | Folk | 137/624.27 |
| 2011/0155937 | A1 | 6/2011 | Arnold | |

FOREIGN PATENT DOCUMENTS

| | | |
|---|---|---|
| DE | 102004045011 | 4/2006 |
| DE | 102006028878 | 12/2007 |
| WO | 2007009077 | 1/2007 |
| WO | 2007009077 A2 | 1/2007 |

OTHER PUBLICATIONS

Emerson Process Management, "Fisher Sliding Stem Control Valves," Product Bulletin for Fisher Sliding Stem Control Valves, published May 2007, 11 pages.

Emerson Process Management, "GVO Series Pneumatic Linear Valve Operators," Bettis Brochure, published Oct. 2007, 20 pages.

Flowserve, "Valtek Spring Cylinder Linear Actuators," published 2006, 12 pages.

International Searching Authority, "International Search Report," issued in connection with international application serial No. PCT/US2010/056406, mailed Mar. 3, 2011, 3 pages.

International Searching Authrotiy, "Written Opinion of the International Searching Authority," issued in connection with international application serial No. PCT/US2010/056406, mailed Mar. 3, 2011, 6 pages.

International Searching Authority, "International Search Report," issued in connection with international application serial No. PCT/US2009/069794, mailed Apr. 8, 2010, 4 pages.

International Searching Authority, "Written Opinion of the International Searching Authority," issued in connection with international application serial No. PCT/US2009/069794, mailed Apr. 8, 2010, 5 pages.

State Intellectual Property Office of P.R. China, "First Office Action," English translation, issued in connection with Chinese application serial No. 200980155491.4, issued Oct. 9, 2012, 10 pages.

United States Patent and Trdaemark Office, "Non-Final Office Action," issued in connection with U.S. Appl. No. 12/648,135, issued Feb. 1, 2013, 25 pages.

The State Intellectual Property Office of the People's Republic of China, "The Second Office Action", issued in connection with Patent Application No. 200910155491.4, mailed Jul. 4, 2013. (9 pages).

International Bureau, "International Preliminary Report on Patentability," issued in connection with International Patent Application No. PCT/US2010/056406, mailed Jul. 12, 2012, 8 pages.

The United States Patent and Trademark Office, "Notice of Allowance and Fee(s) Due", issued in connection with U.S. Appl. No. 12/648,135, mailed Jun. 4, 2013, 12 pages.

The Federal Institute of Industrial Property, "First Office Action," issued in connection with Russian Patent Application No. 2011132108/06(047300), received on Sep. 13, 2013, 9 pages.

Council for the Arab States of the Gulf, GCC Patent Office, "Examination Report," issued in connection with Patent Application No. GC 2010-15160, on Nov. 27, 2013, 4 pages.

* cited by examiner

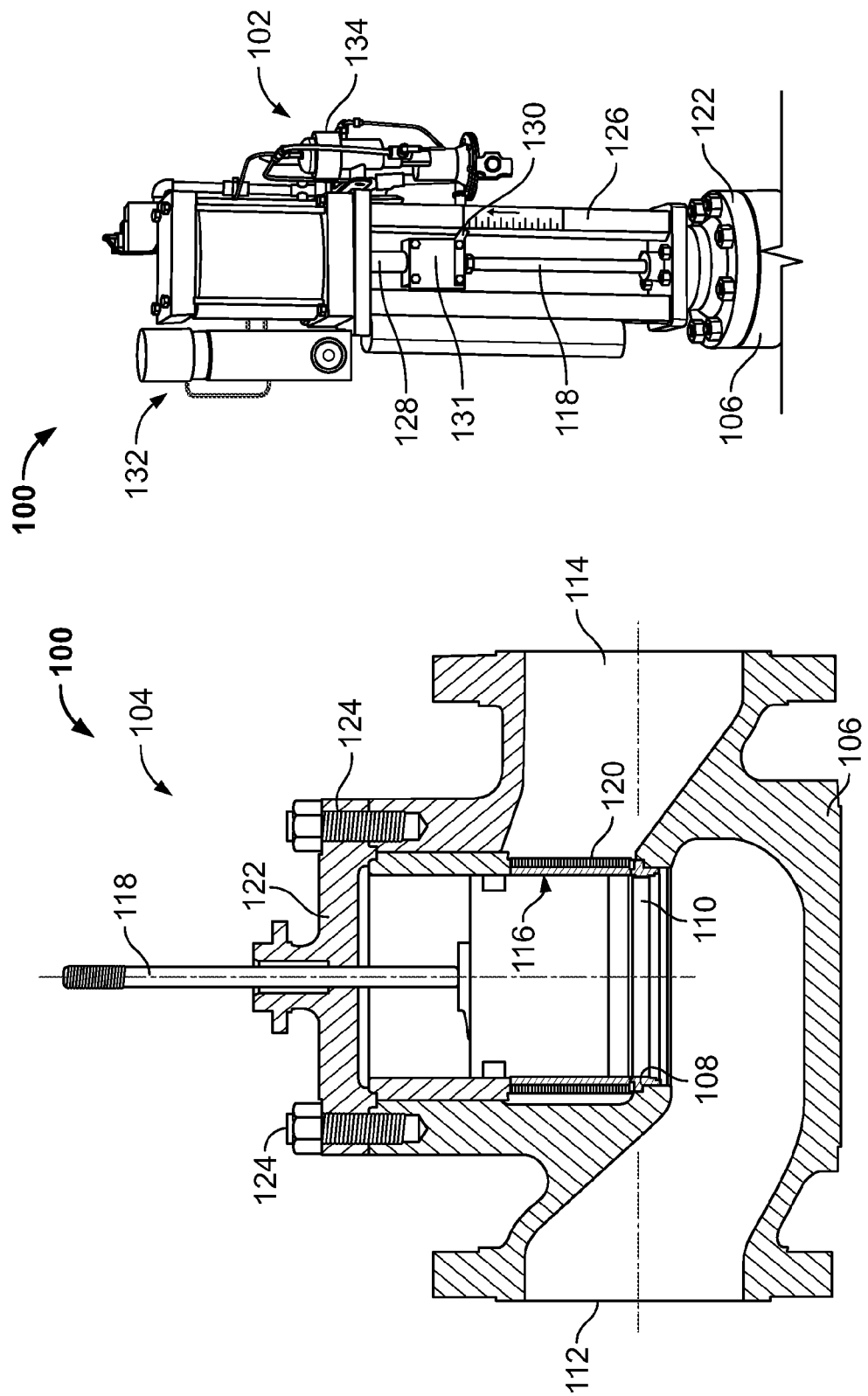

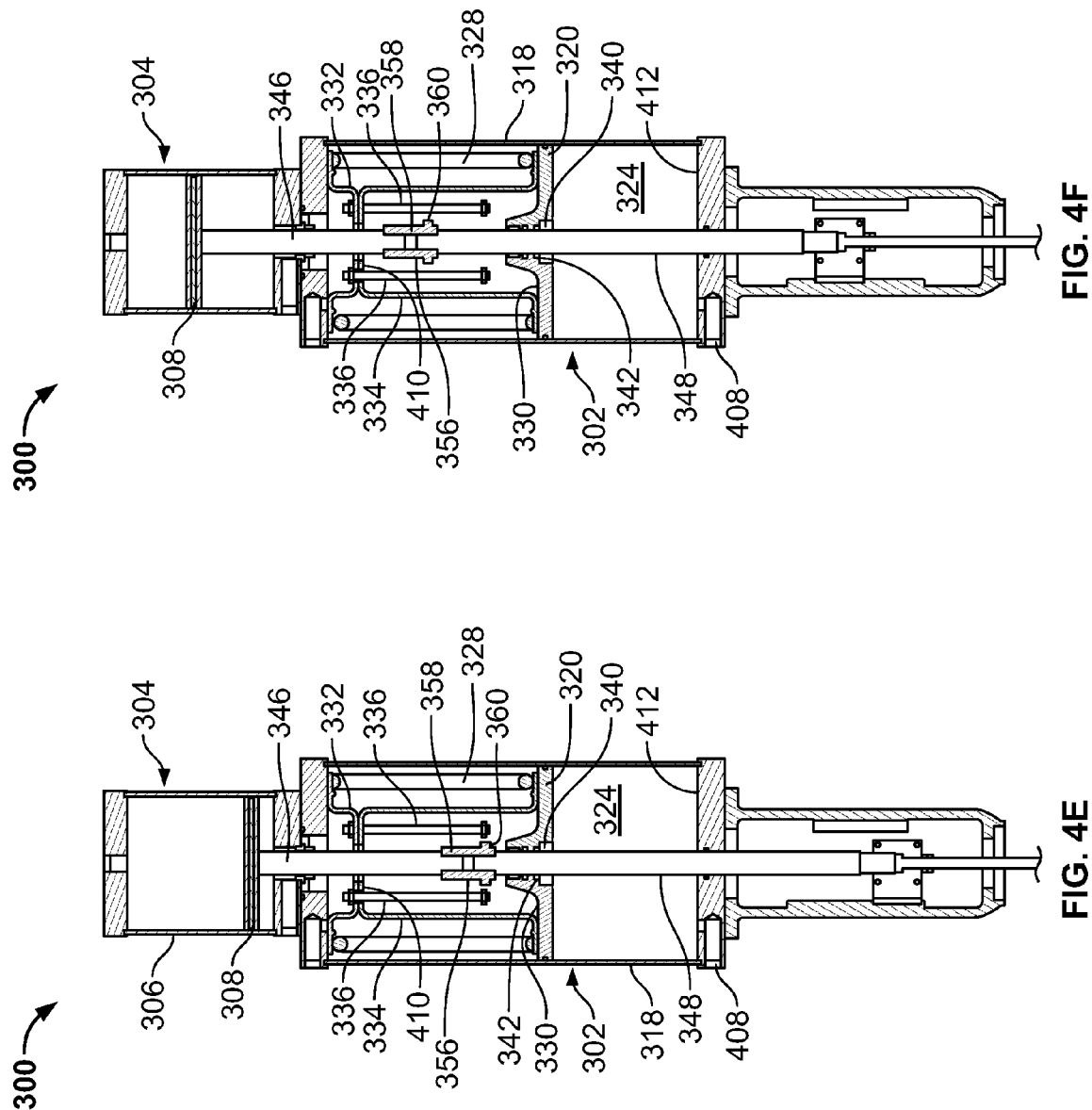

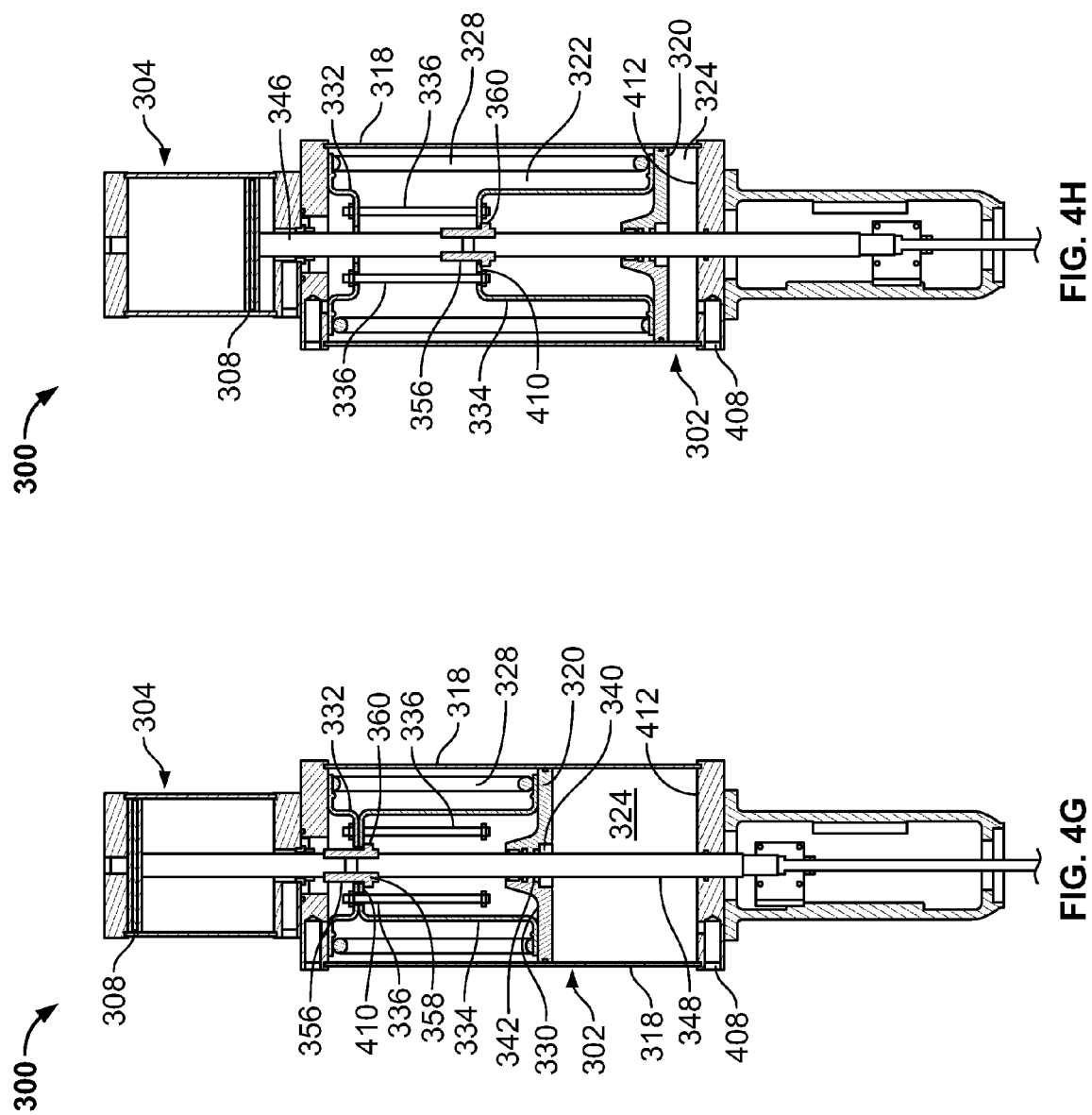

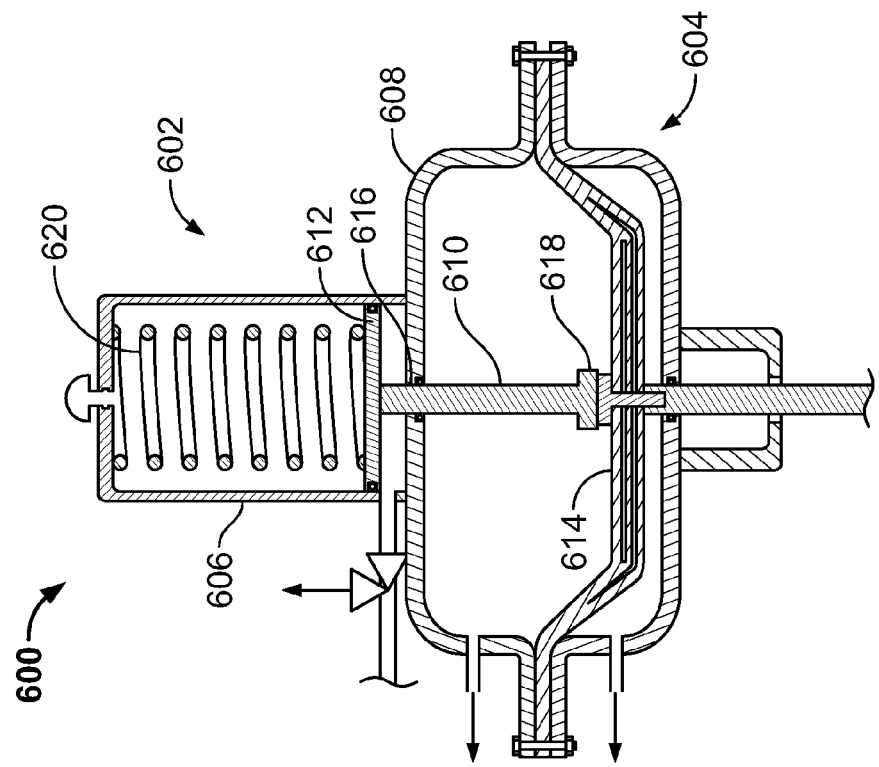
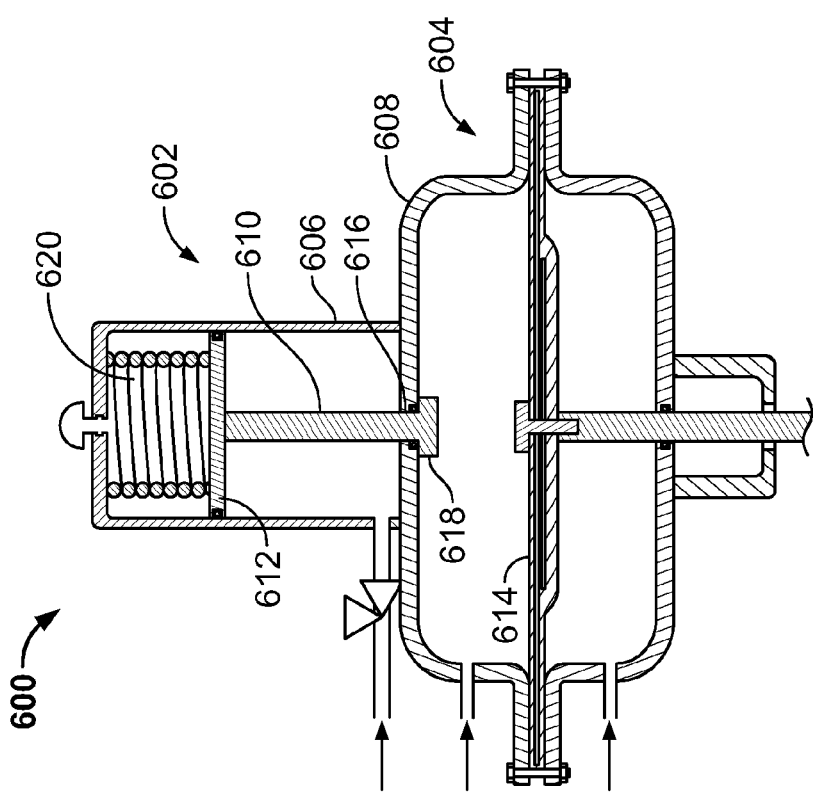

ACTUATOR HAVING AN OVERRIDE APPARATUS

FIELD OF THE DISCLOSURE

The present disclosure relates generally to valve actuators and, more particularly, to valve actuators having override apparatus.

BACKGROUND

Control valves (e.g., sliding stem valves, rotary valves, etc.) are commonly used in process control systems to control the flow of process fluids. Sliding stem valves such as, for example, gate valves, globe valves, etc., typically have a valve stem (e.g., a sliding stem) that moves a flow control member (e.g., a valve plug) disposed in a fluid path between an open position to allow fluid flow through the valve and a closed position to prevent fluid flow through the valve. A control valve typically includes an actuator (e.g., a pneumatic actuator, hydraulic actuator, etc.) to automate the control valve. In operation, a control unit (e.g. a positioner) supplies a control fluid (e.g., air) to the actuator to position the flow control member to a desired position to regulate the flow of fluid through the valve. The actuator may move the flow control member through a complete stroke length between a fully closed position to prevent fluid flow through the valve and a fully open position to allow fluid flow through the valve.

In practice, many process control applications require actuators (e.g., valve actuators) to include fail-safe systems. A fail-safe system provides protection to a process control system by typically causing the actuator and, thus, the flow control member to move to either a fully closed or a fully opened position during emergency situations, power failures, and/or if the control fluid (e.g., air) supply to an actuator (e.g., a pneumatic actuator) is shut down.

Some known piston actuators (e.g. spring-return actuators) may provide a mechanical fail-safe return. For example, these known piston actuators may use an internal spring in direct contact with a piston to provide a mechanical fail-safe return to bias the piston to one end of the stroke travel or the other (e.g. fully opened or fully closed) when the control fluid supply to the actuator fails. However, when used with long-stroke applications (e.g., stroke lengths of four (4) inches or more), such long-stroke spring-return actuators often provide poor control. That is, in certain applications, the spring rate of the bias or fail-safe spring may be sufficient to degrade actuator performance because the supply fluid and the control member must overcome the bias force of the fail-safe spring. Alternately, long-stroke actuators require a spring having a smaller spring rate to accommodate the long-stroke length (i.e., so that the spring can compress the length of the stroke). However, in long-stroke actuators, a spring having a smaller spring rate often lacks sufficient thrust or force to cause the flow control member to sealingly engage a valve seat to prevent leakage through the valve upon a system failure, thereby providing an inadequate fail-safe system.

Double-acting actuators may be used for larger valves requiring long-stroke lengths. Double-acting actuators often provide more accuracy than single-acting actuators because double-acting actuators operate based on a controlled pressure differential across the actuation member (e.g., a piston) and, thus, do not rely on a spring (e.g., a spring rate) to return the actuator to a desired position (e.g., a fully closed position, a fully open position, etc.). However, such known double-acting actuators lack a mechanical fail-safe as provided by the above-noted known spring-return actuators and, thus, are undesirable in some applications.

Many known double-acting actuators use an air-based (e.g., pneumatic) fail-safe system to provide a fail-safe mechanism. However, such known air-based fail-safe systems require additional components (e.g., volume tanks, trip valves/switching valves, volume boosters, etc.), thereby significantly increasing complexity and manufacturing costs. In other examples, some known double-acting long-stroke actuators include a bias or fail spring fail-safe system that directly and continuously acts upon the actuator (e.g., the piston) during operation. However, such bias or fail spring approaches require an oversized piston to overcome the spring forces of the bias or fail spring.

SUMMARY

In one example, an example actuator having an override apparatus includes a first actuator stem coupled to a control actuation member and an override member coupled to the actuator. A spring is operatively coupled to the override member to cause the override member to move the first actuator stem to a predetermined position in response to an override condition.

In another example, an example actuator having an override apparatus described herein includes a first actuator having a first actuation member disposed in a first housing to define a first chamber and a second chamber. The first and second chambers receive a control fluid to cause the first actuation member to move in a first direction and the second chamber receives the control fluid to cause the first actuation member to move in a second direction opposite the first direction when the first actuator is in an operational state. A second actuator has a second actuation member disposed in a second housing to define a third chamber and a fourth chamber. The third chamber receives the control fluid to cause the second actuation member to move to a stored position when the first actuator is in an operational state. A biasing element is disposed in the fourth chamber to cause the second actuation member to move the first actuation member to a predetermined position when the control fluid is released from the third chamber and the first actuator is in a non-operational state.

In yet another example, an actuator apparatus described herein includes means for moving a first actuation member between a first position and a second position and means for moving a second actuation member to a stored position when the means for moving the first actuation member is in an operational state. The actuator apparatus further includes means for causing the second actuation member to move the first actuation member to a predetermined position in response to an override condition.

BRIEF DESCRIPTION OF THE DRAWINGS

FIGS. 1A and 1B illustrate an example known control valve and actuator having a known air-based fail-safe system.

FIGS. 4E-4H are cross-sectional illustrations of the example actuator apparatus of FIGS. 3A and 3B configured as a fail-to-close actuator.

FIGS. 6A and 6B illustrate another example actuator apparatus described herein.

DETAILED DESCRIPTION

Figure 2A:
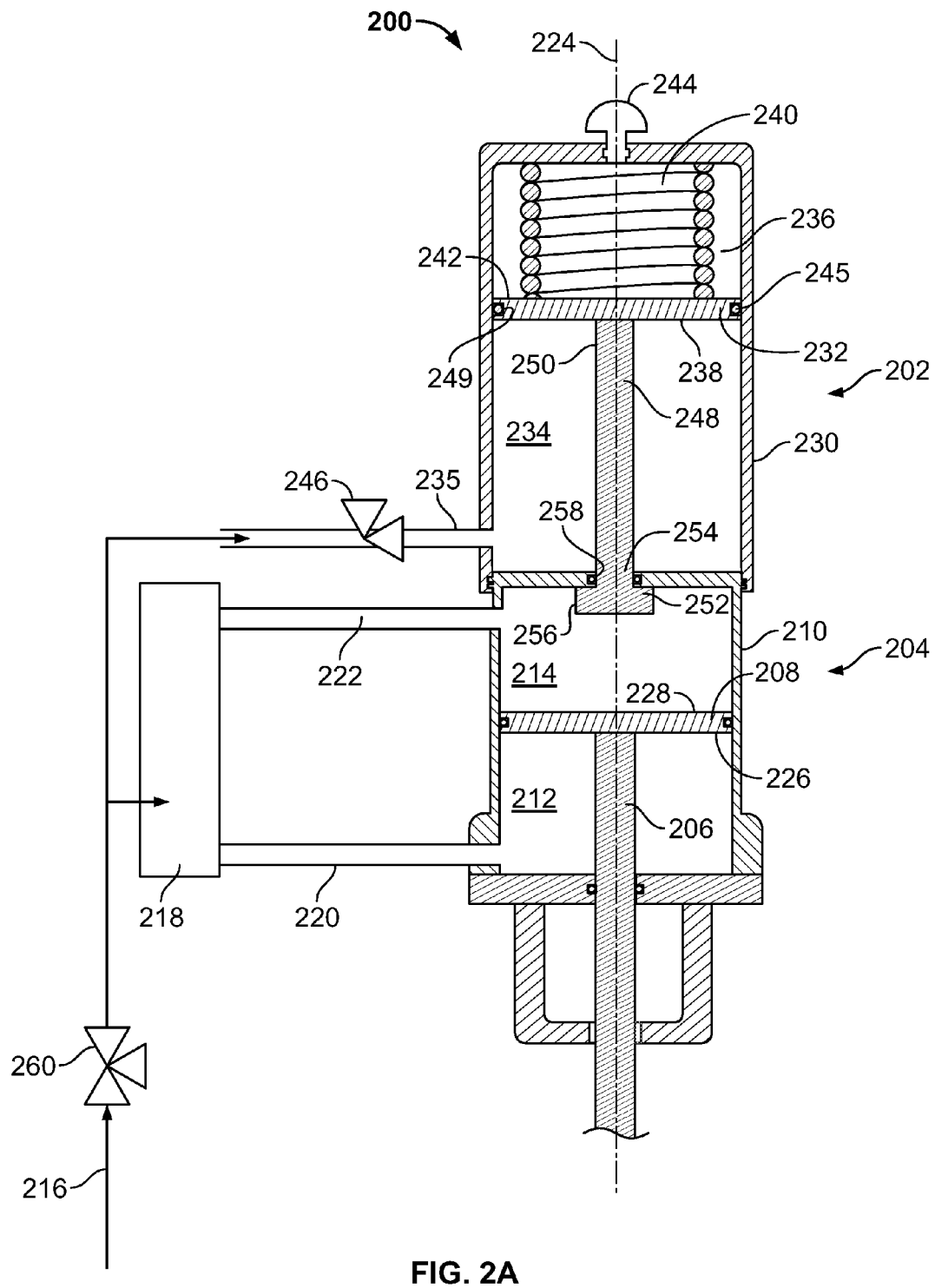
FIG. 2A illustrates an example actuator apparatus described herein having an override apparatus, which is depicted in a stored position.

The example actuators described herein provide an override apparatus that does not require the complex and costly components associated with known fluid-based fail safe systems such as those noted above. Although the example actuators described herein may accommodate any valve stroke length and application (e.g., on/off applications, throttling applications, etc.), the example actuator apparatus described herein are particularly advantageous for use with fluid control devices (e.g., valves) having long-stroke lengths for use with throttling applications.

Before describing the example actuators in greater detail, a brief discussion of a known control valve assembly 100 is provided in connection with FIGS. 1A and 1B. Referring to FIGS. 1A and 1B, the known control valve assembly 100 includes an actuator 102 to stroke or operate a valve 104. As shown in FIG. 1A, the valve 104 includes a valve body 106 having a valve seat 108 disposed therein to define an orifice 110 that provides a fluid flow passageway between an inlet 112 and an outlet 114. A flow control member 116 operatively coupled to a valve stem 118 moves in a first direction (e.g., away from the valve seat 108 in the orientation of FIG. 1A) to allow fluid flow between the inlet 112 and the outlet 114 and moves in a second direction (e.g., toward the valve seat 108 in the orientation of FIG. 1A) to restrict or prevent fluid flow between the inlet 112 and the outlet 114. Thus, the flow rate permitted through the control valve 100 is controlled by the position of the flow control member 116 relative to the valve seat 108. A cage 120 slidably receives the closure member 116 and is disposed between the inlet 112 and the outlet 114 to provide certain flow characteristics of the fluid (e.g., to reduce noise, reduce cavitation, etc.). A bonnet 122 is coupled to the valve body 106 via fasteners 124 and a bonnet 122 to couple the valve 104 to a yoke 126 of the actuator 102.

The actuator 102 shown in FIG. 1B is commonly referred to as a double-acting piston actuator. The actuator 102 includes a piston (not shown) operatively coupled to the flow control member 116 (FIG. 1A) via an actuator stem 128. A stem connector 131 may be coupled to the actuator stem 128 and the valve stem 118 and may include a travel indicator 130 to indicate the position of the actuator 102 and, thus, the position of the flow control member 116 relative to the valve seat 108 (e.g., an open position, a closed position, an intermediate position, etc.). A feedback sensor (not shown) may be configured to provide a signal (e.g., a mechanical signal, an electrical signal, etc.) to a control unit or positioner (not shown).

In operation, the positioner may be operatively coupled to the feedback sensor via a servo to control a supply fluid (e.g., pressurized air, hydraulic oil, etc.) above and/or below the piston of the actuator 102 based on the signal provided by the feedback sensor. As a result, the pressure differential across the piston moves the piston in either a first direction or a second direction to vary the position of the flow control member 116 between a closed position at which the flow control member 116 is in sealing engagement with the valve seat 108 and a fully open or maximum flow rate position at which the flow control member 116 is spaced or separated from the valve seat 108.

The example control valve assembly 100 of FIGS. 1A and 1B includes a fail-safe system 132. A fail-safe system provides protection to a process control system by causing the flow control member 116 to move to a desired position during emergency situations (e.g., if the control unit fails to provide control fluid to the actuator 102). In this example, the fail-safe system 132 is an air-based fail-safe system that includes a trip valve 134 in fluid communication with the actuator 102 and a volume tank (not shown) to store a control fluid (e.g., pressurized fluid).

In operation, the trip valve 134 senses the pressure of the control fluid in the actuator 102. If the pressure of the control fluid in the actuator 102 falls below a predetermined value (e.g., a value set via a control spring disposed in the trip valve 134), the trip valve 134 (having multiple ports and closure members) provides a closed loop system and fluidly couples the volume tank to the actuator 102. The volume tank supplies the stored control fluid to the actuator 102 to move the flow control member 116 to either, the open position, the closed position, or an intermediate position or, for example, locks the flow control member 116 in the last control position. Although the air-based fail-safe system 132 is very effective, the air-based fail-safe system 132 is complex to install, requires additional piping, space requirements, maintenance, etc., thereby increasing costs. Furthermore, the volume tank used with the air-based fail-safe system 132 typically requires periodic certification (e.g., a yearly certification) because it is often classified as a pressure vessel, which results in additional expenditure and time. Additionally, the fail-safe system 132 does not provide a primary (e.g., a spring-based) mechanical fail-safe, which may be desired or required in some applications.

Alternatively, in other examples, long-stroke actuators may include a bias or fail spring operatively coupled to an actuation member (e.g., a piston) of the actuator 102 to provide a primary mechanical fail-safe. However, such bias springs typically lack sufficient thrust or force (e.g., fail to provide adequate seat load) to cause the flow control member 116 to sealingly engage the valve seat 108 upon loss or failure of control fluid to the actuator 102. Thus, such known bias springs typically require a supplemental fail-safe system. Additionally, such known bias or fail springs are disadvantageous because they act directly and continuously on the actuator 102 (e.g., the piston) during operation, thereby requiring an oversized actuation member (e.g., a piston having a larger area) to overcome the bias or fail spring forces.

Figure 2B:
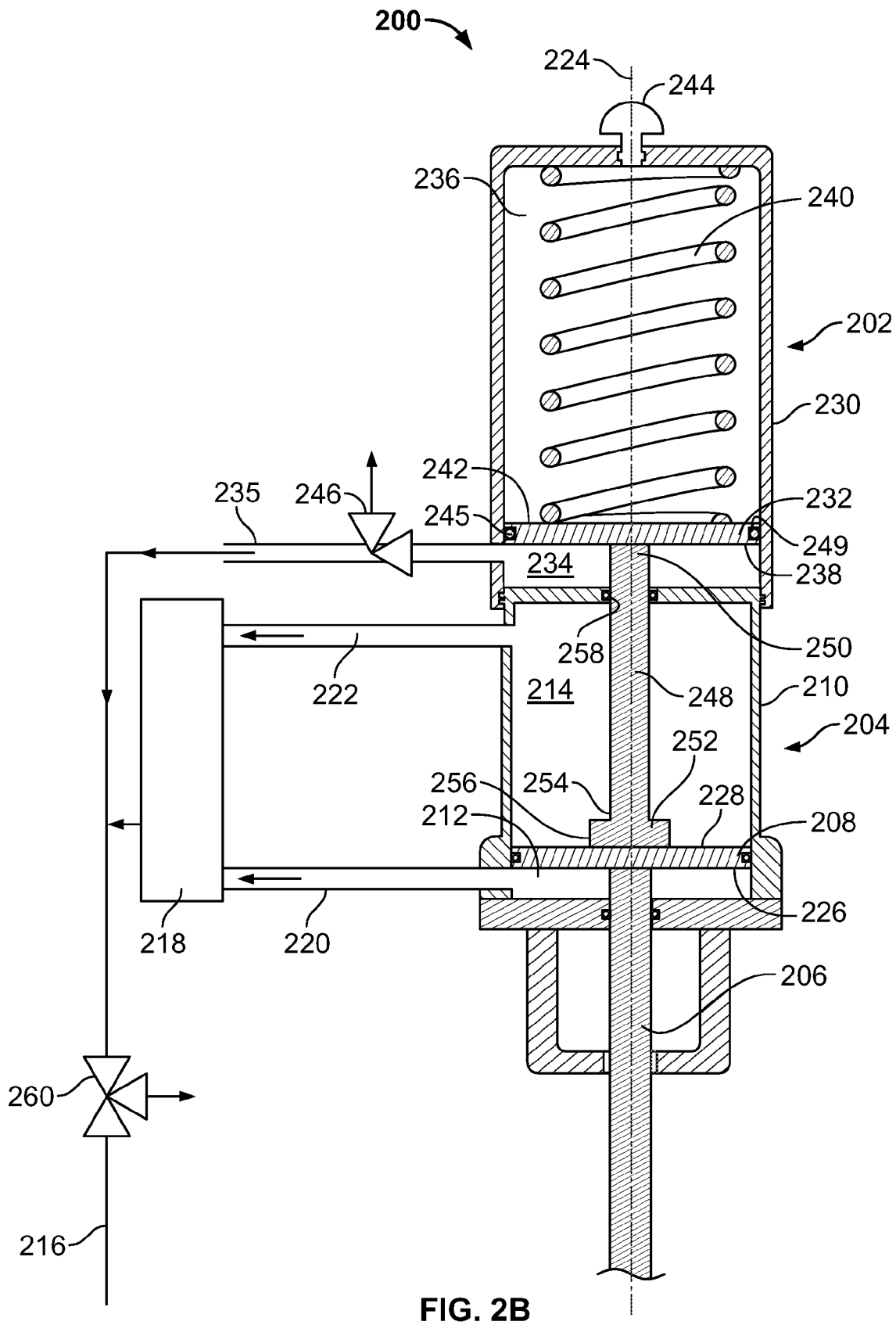
FIG. 2B illustrates the example actuator apparatus of FIG. 2A showing the override apparatus in a predetermined position.

FIGS. 2A and 2B illustrate an example actuator apparatus 200 described herein having an example spring trip or override apparatus 202. FIG. 2A is an illustration of the example actuator apparatus 200 showing the example override apparatus 202 in a stored position. FIG. 2B is an illustration of the example actuator apparatus 200 showing the example override apparatus 202 in an activated position. The example actuator apparatus 200 may be used to operate or drive sliding stem valves such as, for example, gate valves, globe valves, etc., rotary valves such as, for example, butterfly valves, ball valves, disk valves, etc., and/or any other flow control device or apparatus. For example, the example actuator apparatus 200 of FIGS. 2A and 2B may be used to operate or drive the example valve 104 of FIG. 1A.

Referring to FIGS. 2A and 2B, the override apparatus 202 is coupled to a first actuator 204 (e.g., a double-acting actuator). A first actuator stem 206 is coupled to a control actuation member 208 such as, for example, a piston or diaphragm plate. The control actuation member 208 is disposed within a housing 210 to define a first chamber 212 and a second chamber 214. The first actuator 204 is fluidly coupled to a control fluid supply source 216 via a positioner 218. The positioner 218 supplies control fluid to, or exhausts control fluid from, the first chamber 212 and the second chamber 214 via respective passages 220 and 222.

A control fluid such as, for example, pressurized air is supplied by the positioner 218 to the first and second chambers 212 and 214 to create a pressure differential across the control actuation member 208 to move the control actuation member 208 in either a first direction along an axis 224 or a second direction along the axis 224 opposite the first direction. For example, the control actuation member 208 moves in the first direction (e.g., an upward direction in the orientation of FIG. 2A) when the pressure of the control fluid in the first chamber 212 exerts a force on a first side 226 of the control actuation member 208 that is greater than the force exerted on a second side 228 of the control actuation member 208 by the pressure of the fluid in the second chamber 214 (e.g., the control fluid in the second chamber 214 is removed).

Conversely, the control actuation member 208 moves in a second direction (e.g., a downward direction in the orientation of FIG. 2A) opposite the first direction when the pressure of the fluid in the second chamber 214 exerts a force on the second side 228 of the control actuation member 208 that is greater than the force exerted on the first side 226 of the control actuation member 208 by the pressure of the fluid in the first chamber 212 (e.g., the control fluid in the first chamber 212 is removed).

The override apparatus 202 includes a housing 230 having an override actuation member 232 (e.g., an override piston) disposed therein that defines a third chamber 234 and a fourth chamber 236. The third chamber 234 is fluidly coupled to the control fluid supply source 216 via a passageway 235, which provides control fluid (e.g., pressurized air) to the third chamber 234. However, in other examples, the third chamber 234 may be fluidly coupled to any other suitable control fluid supply source such as, for example, an air supply source, a hydraulic supply source, etc. When the third chamber 234 receives the control fluid, the pressure of the control fluid exerts a force on a first side 238 of the override actuation member 232 to bias the override apparatus 202 in the stored position shown in FIG. 2A. A biasing element 240 (e.g., a spring) is disposed in the fourth chamber 236 and imparts a force on a second side 242 of the override actuation member 232 to bias the override actuation member 232 toward the control actuation member 208 when the control fluid in the third chamber 234 is exhausted or released from the third chamber 234 in response to an override condition of the control fluid supply source 216. In other words, the override apparatus 202 activates when the control fluid supply source 216 either fails to provide properly pressurized control fluid to the third chamber 234 or if an alternate controller (e.g. a controller implemented within a Safety Instrumented System) selectively exhausts the fluid pressure in the third chamber as described in greater detail below.

The fourth chamber 236 may include a vent 244, which may vent to atmospheric pressure so that the control fluid in the third chamber 234 need only overcome the force of the biasing element 240 to move the override apparatus 202 to the stored position of FIG. 2A. Also, the override actuation member 232 may include a circumferential seal 245 (e.g., an O-ring) in an annular groove 249 to prevent fluid in the third chamber 234 from venting through the vent 244. A valve 246 (e.g., a quick exhaust valve) may be coupled to the passageway 235 between the control fluid supply source 216 and the third chamber 234 to provide a more rapid release or removal of the control fluid from the third chamber 234 when the control fluid supply source 216 fails (i.e., to enable the override apparatus 202 to activate more quickly).

In this example, the override actuation member 232 includes a thrust stem or rod 248. The thrust stem 248 is coupled to the override actuation member 232 at a first end 250 and includes a coupling or engaging member 252 at a second end 254. In this example, the coupling member 252 comprises a cylindrical body having a flanged portion 256. The coupling member 252 may be a fastener threadably coupled to the end 254 of the thrust stem 248, a clip clamped on the end 254 of the thrust stem 248, or may be integrally formed with the thrust stem 248 as a unitary piece or structure.

The thrust stem 248 is slidably coupled to the first actuator 204 via an aperture 258 (e.g., a vent of the housing 210). When the override apparatus 202 is activated (e.g., when the control fluid supply source 216 fails and the first actuator 204 is in a non-operational state), the coupling member 252 engages the control actuation member 208 and moves the control actuation member 208 to the predetermined position shown in FIG. 2B. It should be appreciated that the pressure in the third chamber may be completely exhausted or may be only partially exhaust, thereby controlling the overall travel of the coupling member 252 of the override apparatus 202 (i.e. the predetermined position may be at a travel extreme, such as fully opened or fully closed or somewhere in between a travel extreme).

In normal operation (e.g., when the first actuator 204 is in an operational state, when the control fluid supply source 216 is operational, etc.), the control fluid supply source 216 provides control fluid to the third chamber 234 to bias the override actuation member 232 and, thus, the coupling member 252 of the thrust stem 248 away from the control actuation member 208. The first actuator 204 is in an operational state when control fluid supply source 216 provides control fluid to the first and/or second chambers 212 and/or 214 via the positioner 218 and the respective passageways 220 and 222.

During emergency situations, for example, or if the control fluid supply source 216 fails, the control fluid may be exhausted or removed from the first and second chambers 212 and 214 via the positioner 218. The actuator apparatus 200 may optionally include a trip valve (e.g., a three-way trip valve) and/or a solenoid valve 260 to rapidly exhaust or remove the control fluid from the first and second chambers 212 and 214. Also, as the control fluid is removed from the first and second chambers 212 and 214, the control fluid is removed from the third chamber 234 via the valve 246. Removal of the control fluid from the third chamber 234 causes the biasing element 240 to expand and move the override actuation member 232 and the thrust stem 248 in a rectilinear path along the axis 224 toward the control actuation member 208 in response to the override condition of the control fluid supply source 216. The coupling member 252 engages the control actuation member 208 (e.g., the second side 228 of the control actuation member 208) and moves the control actuation member 208 toward the predetermined position as shown in FIG. 2B. Thus, the example actuator apparatus 200 described herein provides an override apparatus 202 that acts upon the control actuation member 208 when the control fluid supply source 216 fails or is shut down. It should be appreciated that the override apparatus 202 may be activated as a fail-safe device upon a detected loss of supply fluid or in any situation as determined by a system operator. That is, in any situation wherein a system operator wishes to activate the override apparatus 202, the solenoid valve 260 may be activated.

Figure 3A:
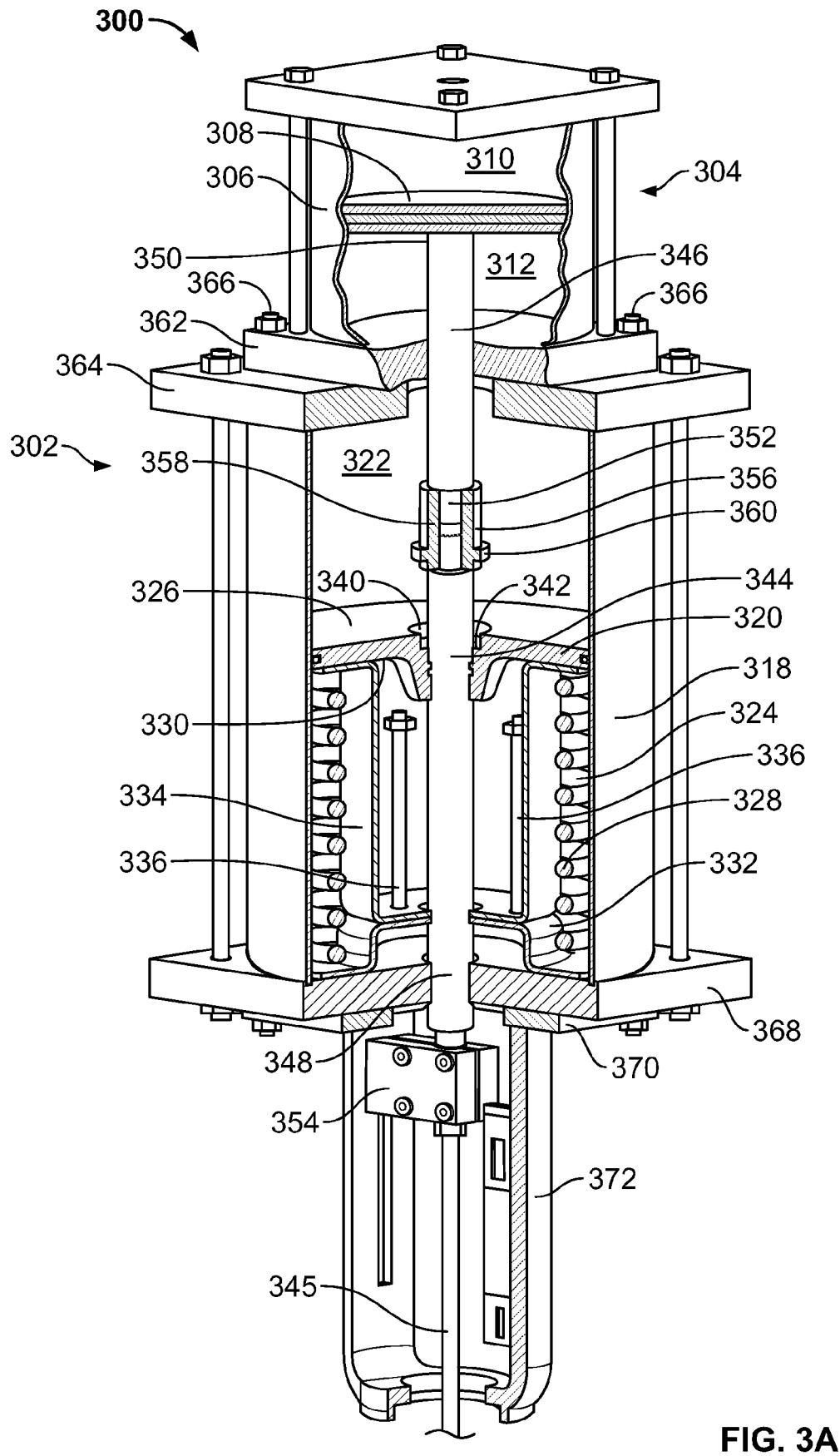
FIG. 3A is a partial cutaway view of another example actuator apparatus described herein having an override apparatus, which is depicted in a first position.
Figure 3B:
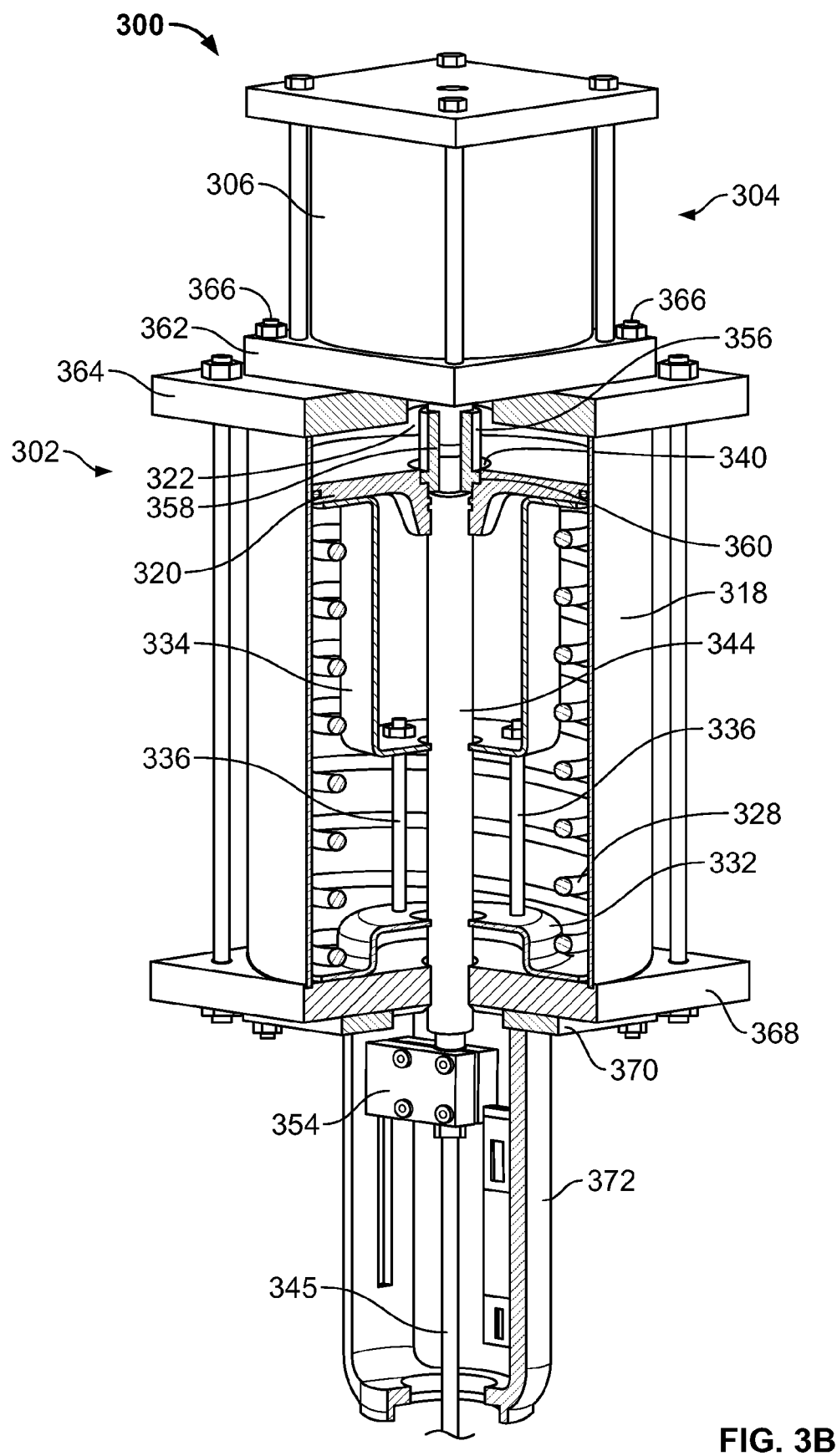
FIG. 3B is another partial cutaway view of the example actuator apparatus of FIG. 3A depicting the override apparatus in a second position.

FIG. 3A illustrates a partial cutaway view of another example actuator apparatus 300 described herein having an override apparatus 302 shown in a stored or non-activated position. FIG. 3B illustrates a partial cutaway view of the example actuator apparatus 300 of FIG. 3A showing the example override apparatus 302 in an activated or predetermined position.

Referring to FIGS. 3A and 3B, the example actuator apparatus 300 includes a control actuator 304 configured as a double-acting actuator. The control actuator 304 includes a housing 306 having a control actuation member 308 such as, for example, a piston disposed therein. The control actuation member 308 defines a first chamber 310 and a second chamber 312 that receive a control fluid (e.g., pressurized air) to move the control actuation member 308 in a first or second direction based on the pressure differential across the control actuation member 308 created by the fluid in the first and second chambers 310 and 312.

As shown, the override apparatus 302 includes a housing 318 having an override actuation member 320 (e.g., a piston, a diaphragm plate, etc.) disposed therein to define a third chamber 322 and a fourth chamber 324. The third chamber 322 is to receive a control fluid (e.g., pressurized air, hydraulic oil, etc.) from a control fluid supply source (e.g., the control fluid supply source 216 of FIGS. 2A and 2B) that may be fluidly coupled to the first and second chambers 310 and 312. The pressure of the fluid in the third chamber 322 exerts a force on a first surface 326 of the override actuation member 320 to cause the override actuation member 320 to move in a first direction or to hold the override actuation member 320 in a stored position (e.g., as shown in FIG. 3A). A biasing element 328 (e.g., a spring) is disposed in the fourth chamber 324 to bias the override actuation member 320 in a second direction opposite the first direction so that when the pressure of the fluid in the third chamber 322 exerts a force on the first surface 326 that is less than the force exerted by the biasing element 328 on a second surface 330 of the override actuation member 320 (e.g., when the control fluid in the third chamber 322 is removed), the override actuation member 320 moves in the second direction. In other words, the override actuation member 320 moves to a predetermined position in response to a control fluid supply source failing to provide control fluid to the first and second chambers 310 and 312 of the control actuator 304 and, thus, also the third chamber 322.

In the example of FIGS. 3A and 3B, the biasing element 328 is illustrated as a spring disposed between a spring seat 332 and a spring retention canister 334. The override actuation member 320, the biasing element 328, the spring seat 332, and the canister 334 may be pre-assembled to a height as shown in FIG. 3B (e.g., substantially equal to a height or size of the housing 318). In this manner, the canister 334 facilitates assembly and maintenance of the example actuator apparatus 300 by preventing the biasing element 328 from exiting the housing 318 during disassembly for maintenance or repairs. The canister 334 is slidably coupled to the spring seat 332 via rods 336 (e.g., bolts) so that the canister 334 moves along (e.g., slides) with the override actuation member 320 (e.g., when the spring 328 is compressed or extends).

In this example, the override actuation member 320 is depicted as a piston having a recessed portion 340 and an aperture 342 to slidably receive an actuator stem 344 that is operatively coupled to a valve stem 345. In other examples, the override actuation member 320 may be a diaphragm plate or any other suitable actuation member. As shown, the actuator stem 344 includes a first actuator stem 346 coupled to a second or elongated actuator stem 348. In other examples, the actuator stem 344 may be a unitary or single piece structure. The first actuator stem 346 is coupled to the control actuation member 308 at a first end 350 and is coupled to the second actuator stem 348 at a second end 352. A travel indicator 354 may be coupled to the second actuator stem 348 and the valve stem 345 to determine the position of the control actuation member 308 and, thus, the position of the flow control member 116 (FIG. 1B) relative to the valve seat 108 (FIG. 1B) (e.g., an open position, a closed position, an intermediate position, etc.).

The example actuator apparatus 300 also includes a connector or coupling member 356. As shown, the coupling member 356 couples the first actuator stem 346 and the second actuator stem 348. The coupling member 356 has a cylindrical body 358 having a lip portion or annular protruding member 360. As described in greater detail below, the coupling member 356 is to engage a portion of the override apparatus 302 (e.g., the override actuation member 320) in response to a control fluid supply source failure (i.e., when the control actuator 304 is in a non-operational state.) As shown in FIG. 3B, the lip portion 360 engages the recessed portion 340 of the override actuation member 320 to operatively couple the override actuation member 320 and the control actuation member 308 when the control actuator 304 is in a non-operational state. In other examples, the coupling member 356 may be integrally formed with the actuator stem 344 as a unitary or single piece or structure. In yet other examples, the coupling member 356 may be any other suitable shape and/or may be any suitable connector that operatively and selectively couples the control actuation member 308 and the override actuation member 320 when the control actuator 304 is in the non-operational state.

As shown, a first flange 362 of the housing 306 is coupled to a first flange 364 of the housing 318 via fasteners 366. However, in other examples, the flange 362 and the flange 364 may be integrally formed as a unitary piece or structure. Similarly, the housing 318 includes a second flange 368 to couple the housing 318 to a flange 370 of a yoke member 372. However, in other examples, the second flange 368 and the flange 370 may be integrally formed as a single piece or structure.

Figure 4A:
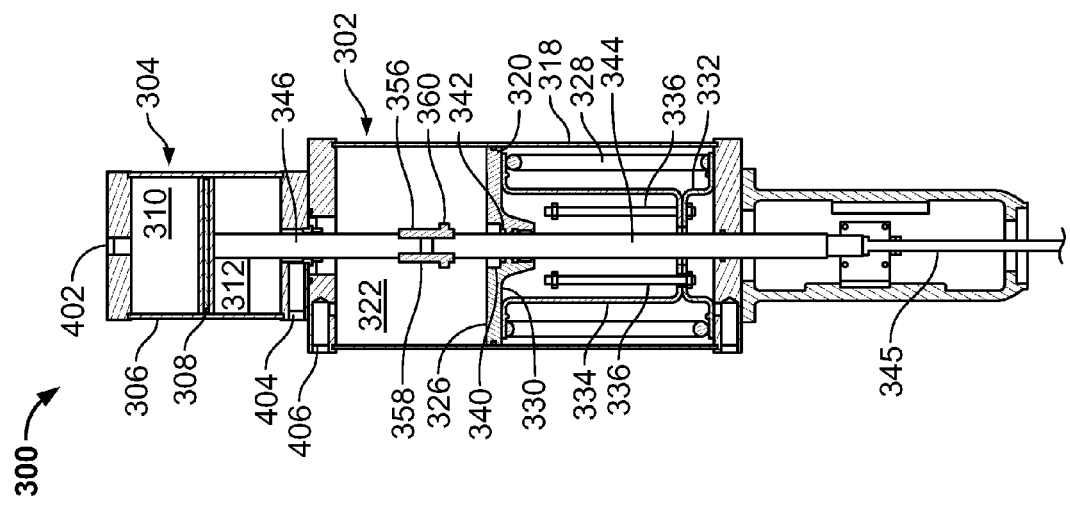
FIGS. 4A-4D are cross-sectional illustrations of the example actuator apparatus of FIGS. 3A and 3B in a first position, an intermediate position, a second position, and a predetermined position, respectively.
Figure 4B:
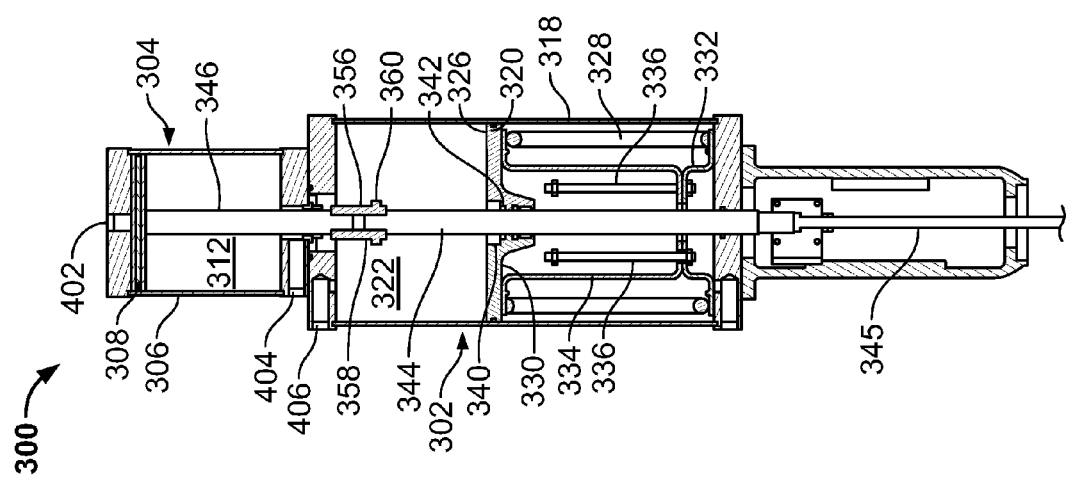
Figure 4C:
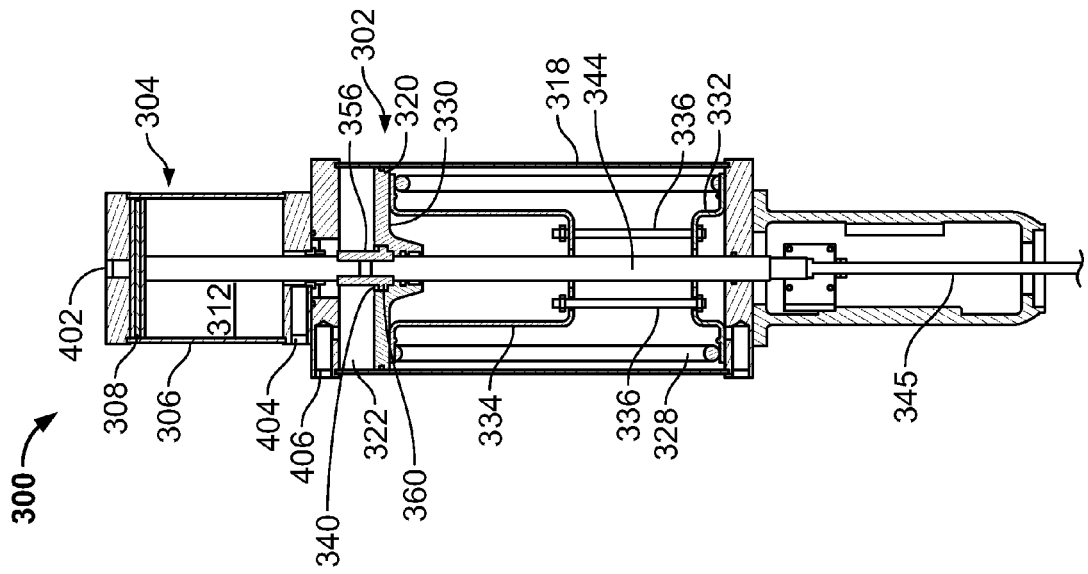
Figure 4D:
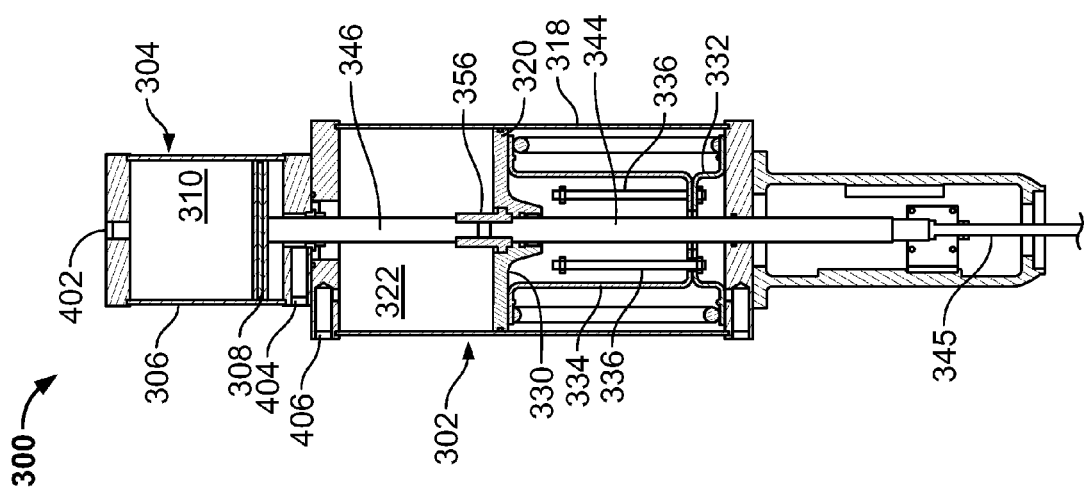

FIGS. 4A-4C are illustrations of the example actuator apparatus 300 at various positions when the control actuator 304 is in an operational state. FIG. 4D is a schematic illustration of the example actuator apparatus 300 when the control actuator 304 is in a non-operational state. Referring to FIGS. 4A-4D, the control actuator 304 is in an operational state when the first chamber 310 receives control fluid via a first port 402 and/or the second chamber 312 receives control fluid via a second port 404 to cause the control actuation member 308 to move between the first position shown in FIG. 4A, the intermediate position shown in FIG. 4B, and the second position shown in FIG. 4C. The length of travel of the control actuation member 308 between the position shown in FIG. 4A and the position shown in FIG. 4C is a full stroke length of the control actuator 304. In some examples, the full stroke length of the control actuator 304 may be greater than eight inches.

As noted above, the example actuator apparatus 300 may be used with fluid control devices such as, for example, sliding stem valves, rotary valves, or any other suitable flow control device or apparatus. For example, the example actuator apparatus 300 may be used to operate or drive the example valve 104 of FIG. 1A.

In operation, referring to FIGS. 1A, 3A, 3B, and 4A-4D, the second chamber 312 receives a control fluid via the second port 404 to move the control actuation member 308 to the first position shown in FIG. 4A. At the first position, the actuator stem 344 causes the valve stem 345 and, thus, the flow control member 116 (FIG. 1A) to move to a first position (e.g., an open position) to allow fluid flow through the valve 104 (FIG. 1A). Referring to FIG. 4B, to adjust the position of the flow control member 116 relative to the valve seat 108 (FIG. 1A) to restrict fluid flow through the valve 104, at least a portion of the control fluid is removed from the second chamber 312 via the second port 404 and control fluid is supplied to the first chamber 310 via the first port 402 so that the pressure differential of the control fluid between first and second chambers 310 and 312 causes the control actuation member 308 to move to the intermediate position shown in FIG. 4B (i.e., a position between the first position of FIG. 4A and the second position of FIG. 4C).

Referring to FIG. 4C, the control fluid is removed from the second chamber 312 and control fluid is supplied to the first chamber 310 to cause the control actuation member 308 to move to the second position. At the second position, the control actuator 304 causes the flow control member 116 to move to a second position (e.g., a closed position) to prevent fluid flow through valve 104.

As illustrated in the examples shown in FIGS. 4A-4C, during normal operation, the third chamber 322 continues to receive control fluid via a third port 406 to retain the override actuation member 320 in the stored position when the control actuation member 308 moves between the first position (FIG. 4A) and the second position (FIG. 4C) (i.e., when the control actuator 304 is in an operational state). At the stored position, the override actuation member 320 and the canister 334 move toward the spring seat 332 until the canister 334 engages the spring seat 332. In this manner, the spring seat 332 provides a travel stop to prevent damage to the biasing element 328 due to over pressurization of fluid in the third chamber 322. In other words, the spring seat 332 prevents the biasing element 328 from compressing in a direction toward the spring seat 332 (in the orientation of FIGS. 4A-4C) beyond the stored position shown in FIGS. 4A-4C.

When the override actuation member 320 is in the stored position, the coupling member 356 moves between a first position and a second position that correspond to the first and the second positions of the control actuation member 308 and does not engage the override apparatus 302. Thus, the override apparatus 302 does not act upon, interfere with or otherwise affect the control actuator 304 when the control actuator 304 is in the operational state. In other words, the control actuator 304 does not have to overcome the spring force of the biasing element 328 when the control actuator 304 is in an operational state.

In some instances, the control fluid provided by, for example, a control fluid supply source may fail or be disconnected, thereby causing the control fluid to release (e.g., vent or exhaust) from the first chamber 310, the second chamber 312, and the third chamber 322. As a result, the control actuator 304 becomes non-operational. In the non-operational state, the control actuator 304 cannot move to control the position of the flow control member 116 and, thus, the flow of fluid between the inlet 112 and the outlet 114 of the valve 104 cannot be controlled.

As shown in FIG. 4D, the override apparatus 302 activates when the control actuator 304 is in a non-operational state. As the control fluid is removed from the third chamber 322, the override actuation member 320 moves in a second direction opposite the first direction (e.g., toward the third chamber 322 in the orientation of FIG. 4D). Removal of the control fluid from the third chamber 322 enables the force exerted on the first surface 326 of the override actuation member 320 to cause the biasing element 328 to expand and drive the override actuation member 320 to a second or expanded position as shown in FIG. 4D. As the biasing element 328 expands, the canister 334 slides along the rods 336 with the override actuation member 320. As the override actuation member 320 moves in the second direction, the recessed portion 340 of the override actuation member 320 engages the lip portion 360 of the coupling member 356 to operatively couple the override actuation member 320 to the control actuation member 308. In turn, the override actuation member 320 causes the control actuation member 308 to move to the predetermined position shown in FIG. 4D. As a result, the flow control member 116 also moves to a predetermined position (e.g., the opened position). To restore or move the override apparatus 302 to the stored position, control fluid is provided to the third chamber 322 (e.g., when the supply source is restored), which causes the override actuation member 320 to move in a direction toward the spring seat 332 (i.e., the stored position).

In the example of FIGS. 4A-4D, the override apparatus 302 of the example actuator apparatus 300 is configured in a fail-to-open configuration when coupled to a valve such as, for example, the valve 104 of FIG. 1A. In other words, the example actuator apparatus 300 (when coupled to the valve 104) is configured so that in the predetermined position, the actuator apparatus 300 causes the flow control member 116 to move away from the valve seat 108 to allow the flow of fluid through the valve 104. However, in other examples, the actuator apparatus 300 may be configured so that in the predetermined position, the actuator apparatus 300 causes the control member 116 to move toward the valve seat 108 to prevent the flow fluid through the valve 104 and/or any other suitable or desired intermediate position. Thus, in other examples, the example actuator apparatus 300 may be configured as a fail-to-close actuator.

A fail-to-close configuration causes a flow control member 116 to sealingly engage the valve seat 108 (e.g., a close position) to prevent the flow of fluid through the valve 104. For example, FIGS. 4E-4H are illustrations of the example actuator apparatus 300 configured as a fail-to-close system when coupled to a valve such as, for example, the valve 104 of FIG. 1A. In this example, the override apparatus 302 is in a reversed (e.g., flipped) orientation relative to that as shown in FIG. 3A.

During normal operation, the fourth chamber 324 receives control fluid via a port 408 to retain the override actuation member 320 in the stored position when the control actuator 304 is in an operational condition. The coupling member 356 moves between a surface 410 of the canister 334 and the second surface 330 of the override actuation member 320 as the control actuator 304 moves between the first and second positions shown in FIGS. 4E and 4G. When the control actuator 304 is in the non-operational state, control fluid is released from the fourth chamber 324 via the port 408, thereby causing the override actuation member 320 to move in a second direction toward the fourth chamber 324 to a predetermined position. The coupling member 356 engages, for instance, a surface 410 of the canister 334 when the override actuation member 320 moves to the predetermined position. In turn, engagement of the coupling member 356 and the canister 334 causes the control actuator 304 to move the predetermined position, thereby also causing the flow control member 116 to move the predetermined position to prevent fluid flow through the valve 104.

Figure 5A:
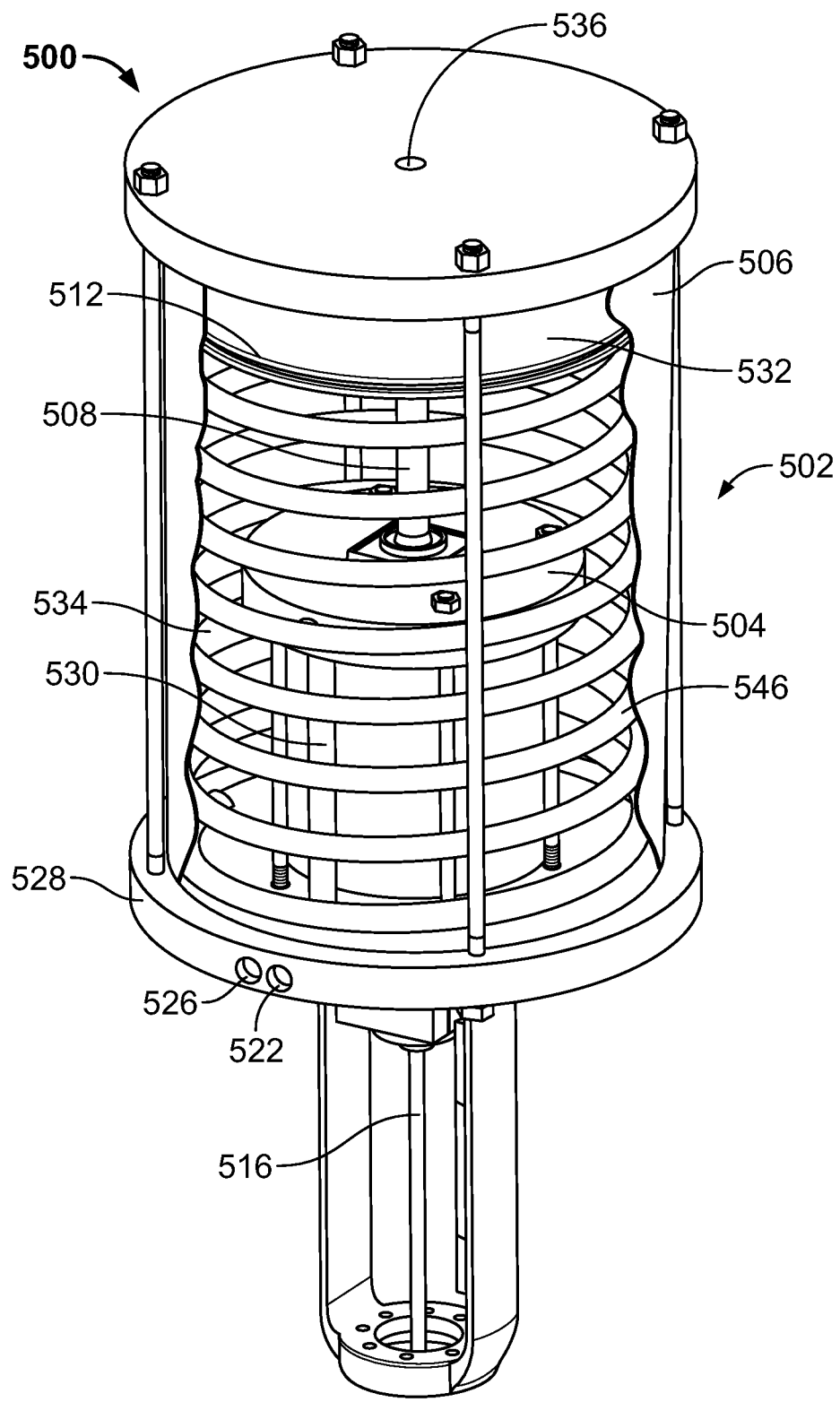
FIG. 5A is a partial cutaway view of another example actuator apparatus described herein and FIG. 5B is a cross-sectional illustration of the example actuator apparatus of FIG. 5A.
Figure 5B:
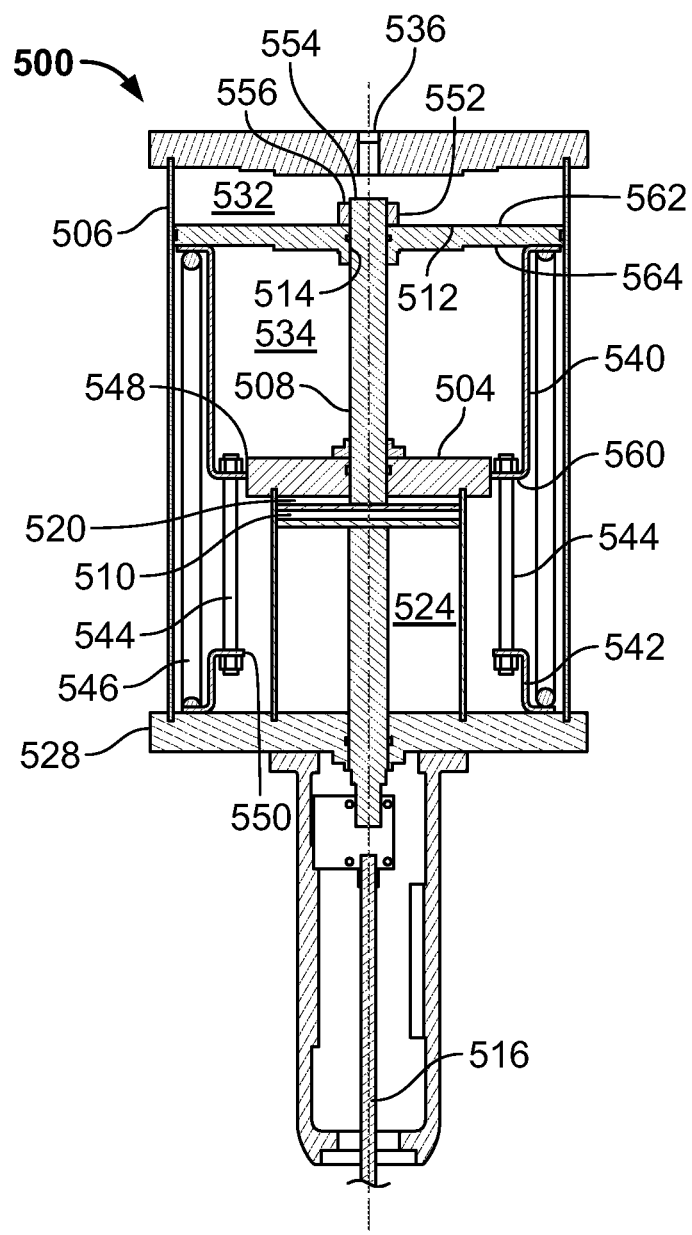

FIG. 5A illustrates a partial cutaway view of yet another example actuator apparatus 500 described herein having an override apparatus 502. FIG. 5B illustrates a cross-sectional view of the example actuator apparatus 500 of FIG. 5A. The example actuator apparatus 500 provides a smaller profile or height than the example actuator apparatus 200 and 300 described herein, thereby requiring less space than the example actuator apparatus 200 and 300.

The example actuator apparatus 500 includes a first housing 504 disposed within or inside a second housing 506. An actuator stem 508 is coupled (e.g., via fasteners) to a control actuation member 510 (e.g., a piston, a diaphragm plate, etc.) of the first housing 504 and slidably coupled to an override actuation member 512 (e.g., a piston, a diaphragm plate, etc.) of the second housing 506. In this example, the override actuation member 512 includes an aperture 514 to slidably receive the actuator stem 508. The control actuation member 510 causes a flow control member operatively coupled to the actuator stem 508 via a valve stem 516 to move between a first position and a second position or any point therebetween.

The control actuation member 510 defines a first chamber 520 that receives a control fluid (e.g., pressurized air, hydraulic oil, etc.) via a first port 522 to cause the control actuation member 510 to move in a first direction and a second chamber 524 that receives a control fluid (e.g., pressurized air, hydraulic oil, etc.) via a second port 526 to cause the control actuation member 510 to move in a second direction opposite the first direction. In this example, the first port 522 and the second port 526 are fluid passageways (e.g., including channels, hoses, etc.) integrally formed within a flange 528 of the second housing 506. The first port 522 includes a pipe or tubing member 530 to couple the first port 522 to the first chamber 520.

The override actuation member 512 is disposed in the second housing 506 to define a third chamber 532 and a fourth chamber 534. The third chamber 532 receives control fluid via a third port 536 to move the override actuation member 512 to a stored position. The override actuation member 512 moves to the predetermined position when the control fluid is released from the third chamber 532 via the third port 536 and the control actuation member 510 is in a non-operational state. For clarity, portions of the override apparatus 502 are not illustrated in FIG. 5A and will be discussed below in connection with FIG. 5B.

Referring to FIG. 5B, the override apparatus 502 includes a spring safety or retention canister 540 coupled to the override actuation member 512 and slidably coupled to a spring seat 542 via rods 544. A biasing element 546 (e.g., a spring) is disposed or captured between the canister 540 and the spring seat 542 to cause the override actuation member 512 and the canister 540 to move to a predetermined position when the control actuation member 510 is in a non-operational state (e.g., if the pressurized control fluid supply system fails) and, thus, the fluid is removed from the third chamber 532. Such a configuration enables the override apparatus 502 to prevent the biasing element 546 from exiting the second housing 506 when the canister 540 is removed from the second housing 506 during maintenance or repair. The canister 540 and the spring seat 542 include apertures 548 and 550 to receive the first housing 504.

The actuator stem 508 includes a coupling member 552 at an end 554 of the actuator stem 508 that is to engage the override actuation member 512 when the override actuation member 512 moves to the predetermined position as shown in FIG. 5B. The coupling member 552 includes or forms an annular protruding member or lip 556. Thus, engagement of the coupling member 552 with the override actuation member 512 causes the first actuation member 510 to move to the predetermined position. The coupling member 552 may be a fastener, a clip, etc. In other examples, the coupling member 552 and the actuator stem 508 are integrally formed as a unitary piece or structure.

In operation, the third chamber 532 receives control fluid via the third port 536 to cause the override actuation member 512 to move to a stored position (i.e., a position in which the biasing element 546 compresses in a direction toward the spring seat 542). In the stored position, the override actuation member 512 and the canister 540 compress the biasing element 546 until a surface 560 of the canister 540 engages the spring seat 542. Removal of the control fluid from the third chamber 532 releases a force exerted on a first side 562 of the override actuation member 512, thereby causing the biasing element 546 to expand and impart a force to a second side 564 of the override actuation member 512 to move the override actuation member 512 to the predetermined position. The canister 540 slides with the override actuation member 512 along the rods 544.

As the override actuation member 512 moves to the predetermined position, the override actuation member 512 engages the coupling member 552 to operatively couple the override actuation member 512 to the control actuation member 510. In turn, the override actuation member 512 causes the control actuation member 510 to move to a third or predetermined position shown in FIG. 5B. To restore or move the override actuation member 512 to the stored position, control fluid is provided to the third chamber 532, which causes the override actuation member 512 to move in a direction toward the spring seat 542.

The example actuators 204, 304, and 504 are depicted as double-acting piston actuators. However, the example override apparatus 202, 302, and 502 are not limited for use with the example control actuators 204, 304, and 504 and may be coupled to any suitable actuator. For example, FIGS. 6A and 6B illustrate another example actuator apparatus 600 described herein. The example actuator apparatus 600 includes an example override apparatus 602 described herein coupled to a double-acting diaphragm actuator 604. FIG. 6A illustrates the example override apparatus 602 in a stored position when the diaphragm actuator 604 is in an operational state. FIG. 6B illustrates the example override apparatus 602 in a predetermined position when the diaphragm actuator 604 is in a non-operational state.

The example override apparatus 202, 302, 502, and 602 described herein may be factory installed or may be retrofitted to existing actuators (e.g., the actuator 104) that are already in the field. For example, referring to FIGS. 6A and 6B, a housing 606 of the override apparatus 602 may be coupled to an upper casing 608 of the diaphragm actuator 604 (e.g., via fasteners). A thrust rod 610 of an override actuation member 612 may be operatively coupled to a control actuation member 614 (e.g., a diaphragm plate) via an aperture or vent 616 in the upper casing 608 so that a coupling member 618 of the thrust rod 610 engages the control actuation member 614 via a spring 620 when the diaphragm actuator 604 is in a non-operational state or condition.

Alternatively or additionally, in other examples, the example actuator apparatus 200, 300, 500, and 600 may be configured as an adjustable travel stop. More specifically, the override actuation members 232, 320, 512, and 612 may be positioned to limit the stroke length or travel of the respective control actuation members 208, 308, 510, and 614. For example, referring to the example actuator apparatus 300 of FIGS. 3A, 3B, and 4A-4D, the spring seat 332 may be interchanged with a different spring seat 332 having a height or length greater than that shown in FIGS. 3A, 3B, and 4A-4D. Thus, a spring seat 332 that has a greater height or length than the spring seat 332 shown in FIGS. 3A, 3B, 4A-4D causes second actuation member 320 to be stored in an intermediate position between the stored position of FIGS. 4A-4C and the predetermined position of FIG. 4D (e.g., closer to the coupling member 356 in the orientation of FIG. 3B). In this manner, the override actuation member 320 acts as a travel stop by limiting the travel of the coupling member 356 as the coupling member 356 moves between the position shown in FIG. 4A and the position shown in FIG. 4B. As a result, for example, when the actuator apparatus 300 is coupled to the valve 104 shown in FIG. 1B, the flow control member 116 is prevented from sealingly engaging the valve seat 108. In other words, when the override actuation member 320 is at the intermediate position described above, the stroke of the control actuator 304 will be less than when the override actuation member 320 is at the stored position shown in FIGS. 4A-4C.

Additionally or alternatively, in high speed and/or high load applications, it may be desirable to include a cushion (e.g., a cushion effect may be created by implementing a spring cushion at the travel extremes or a hydraulic or pneumatic air spring) for the control actuation members 208, 308, 510, or 614 to prevent the control actuation members 208, 308, 510, or 614 from impacting the respective surfaces of the housings 210, 306, 506, or 608. The example actuator apparatus 200, 300, 500, or 600 may be advantageously configured to provide a cushioning and/or deceleration effect to prevent noise and/or damage to the components of the example actuator apparatus 200, 300, 500, or 600.

More specifically, the override actuation members 232, 320, 512, or 612 may be positioned at an intermediate position such that the biasing elements 240, 328, 546, or 620 are not fully compressed when they become operatively engaged with the control actuation members 208, 308, 510, or 614. Such intermediate positioning causes the coupling members 252, 356, 552, or 618 to operatively engage the respective control actuators 208, 308, 510, or 608 prior to completion of the full stroke length of the control actuators 208, 308, 510, or 608. As a result, for high speed and/or high load applications, the coupling members 252, 356, 552, or 618 cause the override actuation members 232, 320, 512, or 612 to compress the respective biasing elements 240, 328, 546, or 620 to complete the full stroke length.

For example, a full stroke length is illustrated in FIGS. 4A and 4C. The position of the control actuation member 308 shown in FIG. 4A and the position of the control actuation member 308 shown in FIG. 4C is a full stroke length (e.g., 100 percent travel) when the override apparatus 302 is in the stored position as shown in FIGS. 4A-4C (i.e., the canister 334 engages the spring seat 332). However, the override apparatus 302 may be configured to move to an intermediate position between the position shown in FIGS. 4A and 4C. For example, third chamber 322 may receive control fluid that applies or exerts a force to the override actuation member 320 to cause it to move to an intermediate position between the stored position of FIGS. 4A-4C and the predetermined position of FIG. 4D so that the canister 334 is away from the spring seat 332 (e.g., forms a gap) when the override actuation member 320 is in the stored position (i.e., when the control actuator 304 is in an operational state). Such an intermediate position causes the control actuator 304 to become operatively engaged with the override actuation member 320 at a stroke position travel that is less than a full stroke length (e.g., to 98 percent of the stroke length). The full stroke length may then be achieved by compressing the biasing element 328 the additional stroke length (e.g., 2 percent of the remaining stroke length) to move the control actuator 304 to the position shown in FIG. 4C to complete the full stroke length.

Thus, as the control actuation member 308 moves to the position shown in FIG. 4C, the lip portion 360 engages the override actuation member 320 at a stroke position less than full stroke (e.g., at 98 percent of full stroke). To complete the full stroke, the lip portion 360 engages the override actuation member 320 to cause the biasing element 328 to compress the remaining portion of the stroke length (e.g., the remaining 2 percent of the travel) until the canister 334 engages the spring seat 332. Compressing the biasing element 328 for a remaining portion of the stroke length in this manner enables the speed of the first actuation member 308 to be reduced at the end of its stroke. Also, for example, in high-load applications, such positioning of the override actuation member 320 causes the biasing element 328 to absorb forces generated by the control actuation member 308 (i.e., mechanical energy of the control actuation member 308 may be imparted to the biasing element 328). As a result, the biasing element 328 provides a deceleration effect and/or load absorption effect to the control actuator 304.

The example override apparatus described herein may be used with double-acting actuators, single-acting spring return actuators, and/or any other actuators. Additionally or alternatively, the example actuator apparatus described herein may be used to operate or drive sliding stem valves (e.g., gate valves, glove valves, etc.), rotary valve (e.g., butterfly valves, ball valves, disk valves, etc.), and/or any other suitable flow control device or apparatus.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents.

What is claimed is:

1. An actuator having an override apparatus, comprising:
    an actuator stem to couple a control actuator to a flow control member of a fluid valve;
    an override actuator to be selectively coupled to the control actuator via a connector in response to an override condition and selectively decoupled from the control actuator when the control actuator is in an operational state, the actuator stem having a first stem to be slidably coupled to one of the control actuator or the override actuator and a second stem to be coupled to the other one of the control actuator or the override actuator, the override actuator being positioned between the control actuator and a fluid valve, the connector being fixed to the actuator stem along a length of the actuator stem and positioned away from the control actuator and the override actuator to operatively decouple the control actuator and the override actuator when the control actuator is in the operational state; and
    a spring operatively coupled to the override actuator to cause the override actuator to move the actuator stem to a predetermined position via engagement with the connector in response to the override condition.

2. An actuator of claim 1, wherein the control actuator comprises a pneumatic piston or a spring and diaphragm actuator.

3. An actuator of claim 1, wherein the spring is in a compressed condition prior to the override condition, and wherein the spring extends to move the override actuator and the actuator stem to the predetermined position via engagement with the connector in response to the override condition.

4. An actuator of claim 1, wherein the override actuator does not affect the operation of the control actuator prior to the override condition.

5. An actuator of claim 1, wherein the first and second stems are coupled via the connector.

6. An actuator of claim 1, wherein the spring and the override actuator are configured to provide a fail-to-open fail-safe operation in response to the override condition.

7. An actuator of claim 1, wherein the spring and the override actuator are configured to provide a fail-to-close fail-safe operation in response to the override condition.

8. An actuator of claim 1, wherein the predetermined position is adjustable by varying an amount of force exerted on the override actuator.

9. An actuator of claim 1, wherein the override actuator has an opening to slidably receive the actuator stem to enable movement of the control actuator relative to the override actuator when the control actuator is in an operational state.

10. An actuator of claim 1, wherein the connector is to prevent the actuator stem from sliding relative to the opening of the override actuator when the control actuator is in the override condition.

11. An actuator of claim 1, wherein the connector does not directly engage the override and the control actuator when the control actuator is in the operational state.

12. An actuator of claim 1, wherein the connector, via the actuator stem, is to move between the override actuator and the control actuator when the control actuator is in the operational state.

13. An actuator having an override apparatus, comprising:
a first actuator having a first actuation apparatus disposed in a first housing to define a first chamber and a second chamber, the first chamber to receive a control fluid to cause the first actuation apparatus to move in a first direction and the second chamber to receive the control fluid to cause the first actuation apparatus to move in a second direction opposite the first direction when the first actuator is in an operational state;
a second actuator having a second actuation apparatus disposed in a second housing to define a third chamber and a fourth chamber, the second actuation apparatus including a piston or diaphragm to move within the second housing, the third chamber is to receive the control fluid to cause the second actuation apparatus to move to a stored position when the first actuator is in an operational state;
a stem having a first portion coupled to the first actuation apparatus and a second portion that slidably extends through an opening formed in the piston or diaphragm of the second actuation apparatus; and
a biasing element disposed in the fourth chamber to cause the second actuation apparatus to move the first actuation apparatus to a predetermined position when the control fluid is released from the third chamber and the first actuator is in a non-operational state, the second actuator to move the first actuation apparatus to the predetermined position via the biasing element without use of the control fluid.

14. An actuator of claim 13, wherein the first housing is mounted inside the second housing.

15. An actuator of claim 13, wherein the biasing element comprises a spring.

16. An actuator of claim 13, further comprising a canister coupled to the second actuation apparatus and slidably coupled to a spring seat, wherein the biasing element is disposed between the canister and the spring seat.

17. An actuator of claim 13, wherein the first actuation apparatus comprises a piston or diaphragm plate.

18. An actuator of claim 13, wherein the second actuator does not act upon the first actuator when the first actuator is in an operational state.

19. An actuator of claim 13, further comprising a connector fixed to an outer surface of the stem, the connector positioned away from the first and second actuation apparatus to operatively decouple the first and second actuation apparatus when the first actuator is in the operational state.

20. An actuator of claim 19, wherein the connector includes a flanged portion to engage the first actuation apparatus or the second actuation apparatus when the second actuation apparatus moves to the predetermined position.

21. An actuator of claim 19, wherein the connector rigidly couples the first portion of the stem and the second portion of the stem.

22. An actuator of claim 19, wherein the connector operatively couples the first actuation apparatus and the second actuation apparatus when the first actuator is in a non-operational state to enable the second actuation apparatus to move the first actuation apparatus to the predetermined position.

23. An actuator of claim 19, wherein the connector is to move within the third chamber when the first actuator is in the operational state.

24. An actuator having an override apparatus, comprising;
means for moving a first actuator positioned in a first housing between a first position and a second position;
means for connecting the first actuator to means for controlling fluid flow through a fluid valve;
means for moving a second actuator positioned in a second housing to a stored position when the means for moving the first actuator is in an operational state, the means for connecting having a first portion slidably received in an opening formed in the first actuator or the second actuator to enable the first actuator or the second actuator to slide along the first portion of the means for connecting, the means for connecting having a second portion coupled to the other one of the first actuator or the second actuator;
means for operatively coupling the first actuator and the second actuator in response to an override condition, the means for operatively coupling being fixed to the means for connecting and positioned away from the first and second actuator to operatively decouple the first and second actuator when the first actuator is in the operational state, and the means for operatively coupling to engage a portion of the first actuator or the second actuator in response to the override condition to enable the second actuator to move the first actuator to a predetermined position in response to the override condition; and
means for adjusting the predetermined position by varying an amount of force exerted on the second means for actuating.

25. An actuator of claim 24, wherein the means for moving the first actuator comprises means for fluidly coupling a first side of the first actuator to a control fluid supply source and means for fluidly coupling a second side of the first actuator to the control fluid supply source.

26. An actuator of claim 25, wherein the means for moving the second actuator to the stored position comprises means for fluidly coupling a first side of the second actuator to the control fluid supply source.

27. An actuator of claim 24, wherein the override condition is a non-operational state.

28. An actuator of claim 24, wherein the first actuator comprises first means for actuating positioned in a first housing to define a first chamber and a second chamber and the second actuator comprises second means for actuating positioned in a second housing to define a third chamber and a fourth chamber, wherein the means for moving moves the first means for actuating between a first position and a second position via the first and second chambers and the second means for actuating to a stored position via the third chamber when the first means for actuating is in an operational state.

29. An actuator of claim 28, further comprising means for biasing disposed within the fourth chamber to cause the second means for actuating to move the first means for actuating to the predetermined position when the means for moving the second means for actuating to the stored position is released from the third chamber and the first means for actuating is in a non-operational state, the second means for actuating to move the first means for actuating to the predetermined position without use of the means for moving.

30. An actuator having an override apparatus, comprising:
an actuator stem to couple a control actuator to a flow control member of a fluid valve;
an override actuator to be selectively coupled to the control actuator via a connector during operation of the actuator, the actuator stem having a first stem to be slidably coupled to one of the control actuator or the override actuator and a second stem to be coupled to the other one of the control actuator or the override actuator the connector being fixed to the actuator stem along a length of the actuator stem and positioned away from the control actuator and the override actuator to operatively decouple the control actuator and the override actuator when the control actuator is in the operational state; and
a spring operatively coupled to the override actuator to cause the override actuator to move the actuator stem to a predetermined position via engagement with the connector in response to an override condition, the connector, via the actuator stem, is to move between the override actuator and a spring seat supporting the spring when the control actuator is in an operational state.

31. An actuator of claim 30, wherein the spring is in a compressed condition prior to the override condition, and wherein the spring extends to move the override actuator and the actuator stem to the predetermined position via engagement with the connector in response to the override condition.

32. An actuator of claim 30, wherein the connector does not directly engage the override and the control actuator when the control actuator is in the operational state.

33. An actuator of claim 1, having an override apparatus, comprising:
an actuator stem to couple a control actuator to a flow control member of a fluid valve;
an override actuator selectively coupled to the control actuator via a connector, the actuator stem having a first stem to be slidably coupled to one of the control actuator or the override actuator and a second stem to be coupled to the other one of the control actuator or the override actuator, the override actuator being positioned between the control actuator and a fluid valve, wherein the override actuator comprises a piston, the actuator stem to extend between a first side of the piston and a second side of the piston via an opening through the piston, and wherein an end of the actuator stem is rigidly coupled to the control actuator; and
a spring operatively coupled to the override actuator to cause the override actuator to move the actuator stem to a predetermined position via engagement with the connector in response to an override condition.

* * * * *

UNITED STATES PATENT AND TRADEMARK OFFICE
CERTIFICATE OF CORRECTION

| | |
|---|---|
| PATENT NO. | : 8,794,589 B2 |
| APPLICATION NO. | : 12/360678 |
| DATED | : August 5, 2014 |
| INVENTOR(S) | : Arnold et al. |

Page 1 of 1

It is certified that error appears in the above-identified patent and that said Letters Patent is hereby corrected as shown below:

In the Claims

Column 18, lines 14 (claim 33): before "having an override" delete "of claim 1,"

Signed and Sealed this
Twenty-first Day of October, 2014

Michelle K. Lee
*Deputy Director of the United States Patent and Trademark Office*